United States Patent [19]
Iga

[11] Patent Number: 5,117,954
[45] Date of Patent: Jun. 2, 1992

[54] OVERRUNNING CLUTCH
[75] Inventor: Kazuo Iga, Yamatotakada, Japan
[73] Assignee: Koyo Seiko Co., Ltd., Osaka, Japan
[21] Appl. No.: 737,479
[22] Filed: Jul. 30, 1991
[30] Foreign Application Priority Data
  Aug. 3, 1990 [JP] Japan ................................ 2-207383
[51] Int. Cl.⁵ ............................................. F16D 41/06
[52] U.S. Cl. ........................................ 192/45; 192/42
[58] Field of Search ................................ 192/45, 42
[56] References Cited
  U.S. PATENT DOCUMENTS
  3,691,854  9/1972  Barthruff et al. ............. 192/45 X
  4,566,567  1/1986  Miyatake ...................... 192/45
  4,753,330  6/1988  Ohzono et al. ................ 192/48.4
  4,883,152 11/1989  Froment ....................... 192/42
  4,901,832  2/1990  Werner ........................ 192/42
  4,986,140  1/1991  Morishita et al. ............ 192/45 X
  FOREIGN PATENT DOCUMENTS
  63-101528  5/1988  Japan ........................... 192/45

Primary Examiner—Leslie A. Braun
Assistant Examiner—Andrea Pitts

[57] ABSTRACT

An overrunning clutch comprises a hollow drive shaft, a driven shaft including a large diameter portion and a small diameter portion loosely fit in the drive shaft, a cylindrical body having an inner peripheral surface in which cam surfaces are formed to function as an overrunning clutch and being splined to one end of the large diameter portion adjacent to the small diameter portion of the driven shaft, a retainer held within the cylindrical body, rollers held in roller pockets of the retainer, springs disposed in the roller pockets of the retainer to urge the roller, an annular abutment plate fit around the small diameter portion of the driven shaft and adapted to position the cylindrical body, and a fixing member fit around the small diameter portion of the driven shaft and adapted to fix the annular abutment plate in place. The overrunning clutch is thus simple and strong, and prevents "dancing phenomenon" of the rollers by firmly holding the rollers in such a position that the rollers are free to race.

5 Claims, 5 Drawing Sheets ize shaft extending across the drive shaft and the driven shaft, a plurality of cam surfaces formed in the inner peripheral surface of the cylindrical body, a retainer including a pair of rings and a plurality of column portions axially extending between the rings, and a plurality of rollers disposed between adjacent column portions, said column portions each having a pair of tongue-like springs axially extending between the rings and disposed on opposite sides of each roller, said springs, when the drive shaft is driven for rotation, being operable to slightly bias the rollers against a space defined between the large diameter portion of the driven shaft and the cam surfaces so as to lock the rollers in the space, said driven shaft having a tapered surface between the large diameter portion and the small diameter portion, one of the rings in the retainer having an inclined surface mating with the tapered surface of the driven shaft whereby when the driven shaft is rotated at a speed greater than that of the drive shaft, the driven shaft and the retainer are moved in the axial direction to firmly hold the rollers in a position where they are free to race.

OVERRUNNING CLUTCH

BACKGROUND OF THE INVENTION

The present invention relates to an overrunning clutch for use, for example, in the engine starter of an agricultural machine (lawn mower or sprayer).

FIG. 5 is a side view, in longitudinal section, of a conventional transmission system disposed between a starter motor and a crankshaft and including an overrunning clutch.

Referring to FIG. 5, numeral 52 is a starter motor. A drive gear 54 mounted on the output shaft of the starter motor 52. An idle gearing 56 has a large gear 56a and a small gear 56b are integral together. Numeral 58 is a reduction gear. Numeral 60 is a transmission sleeve or cylindrical body on which the reduction gear 58 is fixedly mounted. The large gear 56a and the small gear 56b in the idle gearing 56 are meshed with the drive gear 54 and the reduction gear 58, respectively. With this arrangement, power is transmitted from the starter motor 52 to the transmission sleeve 60 with the speed of rotation of the starter motor 52 being reduced through the gears.

The sleeve 60 is fit coaxially around the crankshaft 62. A shell-type overrunning clutch 64 is disposed between the sleeve 60 and the crankshaft 62. As shown in FIGS. 6 and 7, the overrunning clutch 64 includes an outer member or shell 66, a retainer 68, and a plurality of rollers 70. The shell 66 has a cylindrical portion 66a, and a pair of flanges 66b extending radially and inwardly from opposite ends of the cylindrical portion 66a. Cam surfaces 66c are formed in the inner peripheral surface of the cylindrical portion 66a and correspond in number with the rollers 70. The retainer 68 is made of synthetic resin and includes a pair of opposite annular rings 68a and 68a, and a plurality of column portion 68b axially extending between the rings 68a. A plurality of roller pockets 68c are defined between adjacent column portions 68b. The rollers 70 are rollingly disposed within the corresponding roller pockets 68c.

Each column portion 68b in the retainer 68 has an integral spring 68d. The spring 68d takes the shape of a bifurcated tongue adapted to urge the roller 70 in the roller pocket 68b in the direction in which the roller 70 is locked between the cam surfaced 66c and the crankshaft 62.

The shell 66 of the overrunning clutch 64 thus far constructed is press fit in the sleeve 60.

Operation of the overrunning clutch thus constructed is as follows.

To start up an engine, the starter motor 52 is first energized to rotate the sleeve 60 in the direction of an arrow $a_2$ through the drive gear 54, the idle gearing 56, and the reduction gear 58. This causes the shell 66 and the retainer 68 to rotate in the same direction. The rollers 70 urged by the springs 68d are then moved in the direction in which the space between the cam surfaces 66c and the crankshaft 62 are narrower. After the rollers have finally been locked between the cam surfaces 66c and the crankshaft 62, rotation of the shell 66 is transmitted through the rollers 70 to the crankshaft 62. The crankshaft 62 is then rotated in the direction of an arrow $b_2$ so as to start up the engine.

The starter motor 52 is stopped when the engine has been started. However, the crankshaft 62 is rotated at a higher speed in the direction of the arrow $b_2$ by means of the engine. At this time, the sleeve 60 is stopped as it is connected through the reduction gear 58, the idle gearing 56, and the drive gear 54 to the starter motor 52 now stopped. The shell 66 and the retainer 68 are also stopped as the shell is secured to the sleeve 60. A frictional force is applied from the crankshaft 62 to the rollers 70 to move the rollers 70 within the roller pockets 68c in the direction of the arrow $b_2$. The rollers 70 are moved in the direction in which the space between the cam surfaces 66c and the crankshaft 62 are wider, against the action of the tongue-like springs 68d. The rollers 70 are freely rolled in the space and separated from the cam surfaces 66c and the crankshaft 62. As a result, power is no longer transmitted from the crankshaft 62 to the shell 66 and thus, the starter motor 52.

It has been stated that when the crankshaft 62 is driven for rotation by the engine, the rollers 70 are moved in the direction in which the space between the cam surfaces 66c and the crankshaft 62 are narrower and is then free to race in the wide space. Although the rollers 70 move in that direction immediately after they came into contact with the crankshaft 62, they are moved in the direction in which the space between the cam surfaces 66c and the crankshaft 62 are narrower as soon as they race, and a pushing force is no longer applied from the crankshaft 62. This is because the springs 68d always urge the rollers 70 in the direction in which the space is narrower. Thereafter, the rollers are brought into contact with the crankshaft 62 and again, moved in the direction in which the space is wider. The rollers 70 are contacted with and separated from the crankshaft 62 in an intermittent manner. This is called a "dancing phenomenon". When the rollers 70 are moved in the direction in which the rollers 70 are locked, they become worn and hot due to friction. This also prevents smooth rotation of the crankshaft 62. Frictional heat results in an increase in the temperature of the rollers 70, the crankshaft 62 and the retainer 68. Seizing may occur when the temperature of these components is raised above a predetermined level.

If seizing occurs, the crankshaft 62 and the shell 66 are locked to give an impact to or cause damage to the transmission system.

The retainer 68 is easily damaged due to frictional heat, particularly in the case that the retainer 68 with the springs 68d is made of synthetic resin.

Each roller 70 can be held in such a position that it races if the spring 68 has a smaller biasing force. However, such a smaller biasing force fails to firmly lock the roller 70 and to transmit rotation from the sleeve 60 to the crankshaft 62 when the engine is to be started up.

SUMMARY OF THE INVENTION

In view of the foregoing, it is an object of the present invention to provide an overrunning clutch which prevents "dancing phenomenon" of rollers by firmly holding the rollers in such a position that they are free to race, which prevents seizing of the rollers due to frictional heat and is highly durable, and which prevents damage to a transmission system.

Another object of the present invention is to provide an overrunning clutch which is simple and strong.

In order to achieve these objects, there is provided an overrunning clutch comprising a hollow drive shaft, a driven shaft including a large diameter portion and a small diameter portion loosely fit in the drive shaft, a cylindrical body having an inner peripheral surface extending around the peripheral surface of a transmission section positioned at one end of the drive shaft, and a plurality of cam surfaces formed in the inner peripheral surface and adapted to function as an overrunning clutch, the cylindrical body being fit around the small diameter portion of the driven shaft to surround the transmission section of the drive shaft and splined to one end of the large diameter portion adjacent to the small diameter portion, a retainer held within the cylindrical body and including a plurality of roller pockets corresponding in position to the cam surfaces, a plurality of rollers rollingly disposed within the corresponding roller pockets and adapted to contact with the inner peripheral surface of the cylindrical body and the peripheral surface of the transmission section of the drive shaft, springs disposed within the roller pocket and adapted to urge the rollers in the direction in which the rollers are locked in the cam surfaces, an annular abutment plate fit around the small diameter portion of the driven shaft and having one side placed in abutment with the cylindrical body and an end surface of the large diameter portion so as to position the cylindrical body, and a fixing member fit around the small diameter portion of the driven shaft and having one side placed in abutment with the annular abutment plate to fix the annular abutment plate in place.

With this arrangement, when the driven shaft is rotated, the cylindrical body splined to the cylindrical body, and the retainer held by the cylindrical body are rotated together with the driven shaft. The rollers, held by the retainer, are also rotated. As a result, a centrifugal force is applied to each roller to bring the roller into contact with the cam surface of the cylindrical body. The resultant component causes the roller to move along the cam surface against the action of the spring and to move in a direction opposite to the direction in which the roller is locked, or to move in the direction in which the roller is free to race. The centrifugal force continues to be applied to the rollers while the driven shaft is being rotated. This firmly holds the rollers in such a position that the rollers are free to race, and prevents "dancing phenomenon" of the rollers.

Further, the cylindrical body is held in position on the driven shaft by the annular abutment plate, and the annular abutment plate is fixed in place by the fixing member. The cylindrical body is thus secured on the driven shaft in a cantilever fashion. The present invention thus provides a simple and strong overrunning clutch.

The annular abutment plate can be firmly fixed if one side of the annular abutment plate is placed in abutment with one end of the retainer. No extra component is required to fix the retainer in place.

The fixing member is received in an annular groove which is formed in the small diameter portion of the driven shaft adjacent to the large diameter portion. In this way, the fixing member can simply and firmly be mounted.

Additionally, a radial recess is formed in each cam surface whereby the roller can be held in the recess against the action of the spring. This allows the roller to race in a space near the recess, and prevents "dancing phenomenon" of the roller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side view, in longitudinal section, of a transmission system disposed between a starter motor and a crankshaft and including an overrunning clutch;

FIG. 2 is a side view, in longitudinal section, of the overrunning clutch;

FIG. 3 is a sectional view taken along the line III—III in FIG. 2;

FIG. 4 is a longitudinal sectional view showing the principal part of the overrunning clutch in use;

FIG. 5 is a side view, in longitudinal section, of a conventional transmission system disposed between a starter motor and a crankshaft and including an overrunning clutch, FIG. 6 is a side view, in longitudinal section, of the prior art overrunning clutch; and FIG. 7 is a sectional view taken along the line VII—VII in FIG. 6.

DESCRIPTION OF THE PREFERRED EMBODIMENT

The present invention will now be described, by way of example, with reference to the accompanying drawings.

Figure 1:
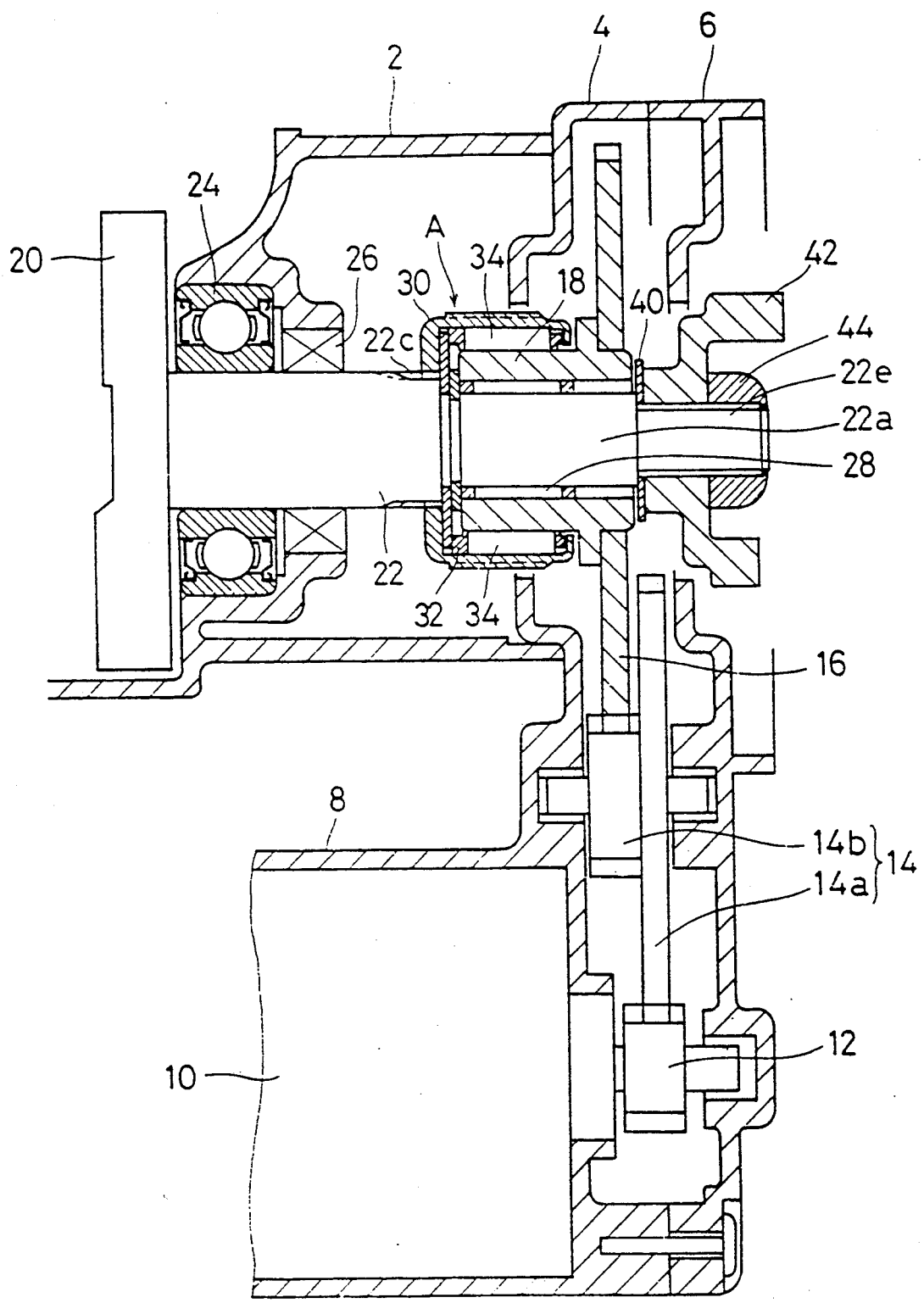
FIGS. 1 to 4 illustrate one embodiment of the present invention.
Figure 2:
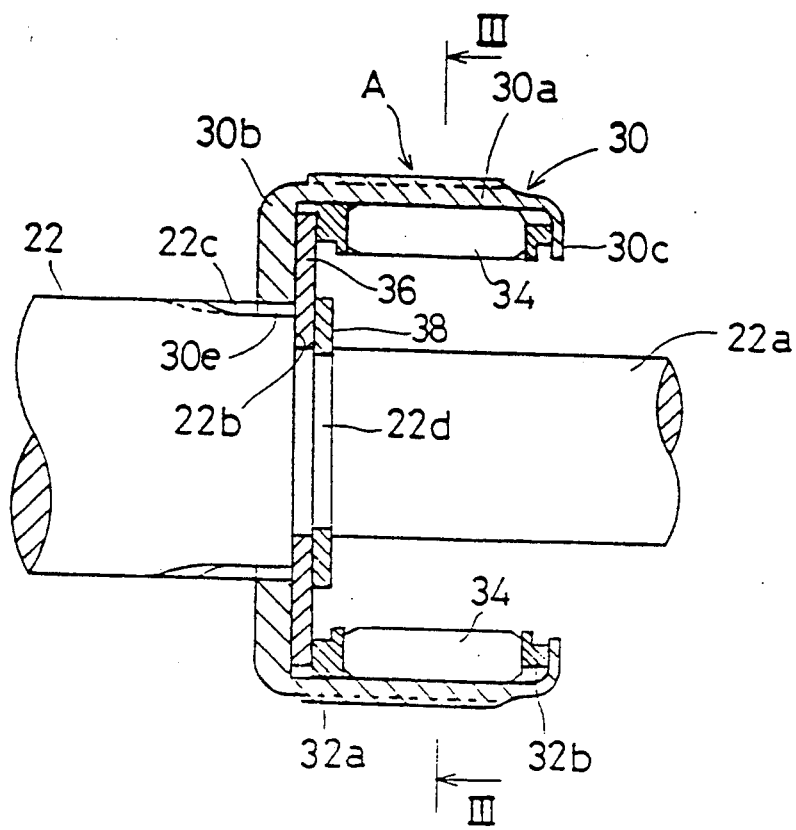
Figure 3:
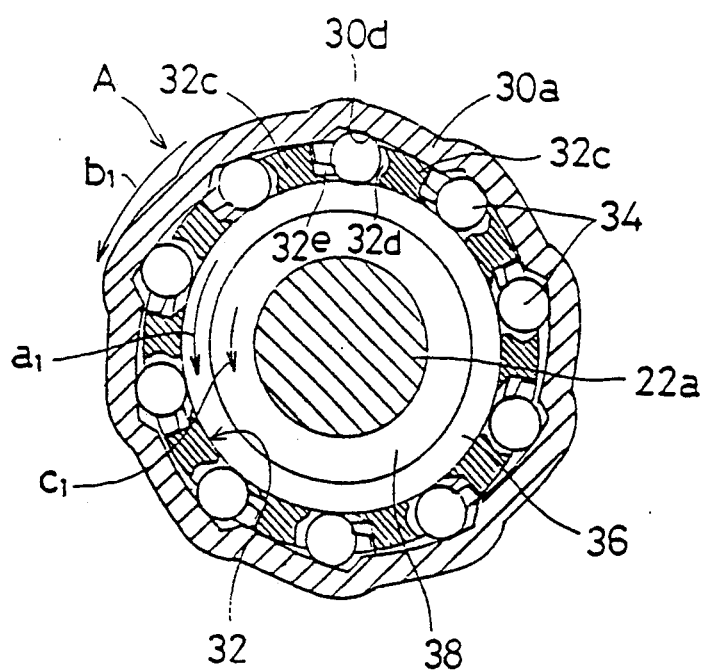

FIG. 1 is a side elevation, in longitudinal section, of a transmission system for use, for example, in an engine starter of an agricultural machine (lawn mower or sprayer). The transmission system includes an overrunning clutch and is disposed between a starter motor and a crankshaft. FIG. 2 is a side view, in longitudinal section, of the overrunning clutch. FIG. 3 is a longitudinal sectional view taken along the line III—III in FIG. 2.

Referring to FIG. 1, an engine casing 2, gear casings 4 and 6 and a motor housing 8 are provided. A starter motor 10 has a drive gear 12 secured on the output shaft thereof. An idle gearing 14 is composed of a large gear 14a and a small gear 14b integral with the large gear 14a. A reduction gear 16 is secured on a cylindrical body or sleeve 18. The idle gearing 14 is journalled by the gear casings 4 and 6. The large gear 14a and the small gear of the idle gearing 14 are meshed with the drive gear 12 and the reduction gear 16, respectively. Power is transmitted from the motor 10 to the sleeve (drive shaft) 18 while the speed of rotation of the motor 10 is being reduced through these gears.

A crank 20, a crankshaft 22 (driven shaft) and a ball bearing 24 are provided. Through ball bearing 24, the crankshaft 22 is rotatably supported within the engine casing 2. Numeral 26 is a bearing seal. The crankshaft 22 has a reduced diameter portion 22a at one end. A step 22b is formed between the reduced diameter portion 22a and the large diameter portion or body of the crankshaft 22. The crankshaft 22 has splines 22c which extend axially from the step 22b toward the crank. An annular groove 22d is formed in the reduced diameter portion 22a of the crankshaft and is spaced a predetermined distance away from the step 22b. The reduced diameter portion 22a has a threaded end 22e.

The sleeve 18 is rotatably supported on the reduced diameter portion 22a through a needle bearing 28. A one-way or overrunning clutch A extends between the sleeve 18 and the crankshaft 22. The overrunning clutch A is fixed to the crankshaft 22 and is designed to transmit rotation only from the sleeve 18 to the crankshaft 22. This overrunning clutch A is constructed as shown in FIGS. 1 and 2. FIGS. 1 and 2 are side and front views, in section, of the overrunning clutch, respectively.

The overrunning clutch A includes a shell (cylindrical body) 30, a retainer 32, a plurality of rollers 34, an annular abutment plate 36, and a fixing member (C-shaped spacer) 38.

The shell 30 has a cylindrical portion 30a, and thick and thin flanges 30b and 30c extending radially and inwardly from opposite ends of the cylindrical portion 30a. Cam surfaces 30d are formed in the inner peripheral surface of the cylindrical portion 30a and correspond in number to the rollers 34. The thick flange 30d has splines 30e in its inner peripheral surface for engagement with the axial splines 22c of the crankshaft.

The retainer 32 is made of synthetic resin and includes a pair of opposite annular rings 32a and 32b, a plurality of column portions 32c extending between the rings 32a and 32b, roller pockets 32d defined between adjacent column portions 32c, and springs 32e, in the form of bifurcated tongues, adapted to urge the rollers 34 rollable within the roller pockets 32d in the direction in which the rollers 34 are locked.

The annular abutment plate 36 is inserted for abutment with the inner surface of the thick flange 30b and the annular ring 32a of the retainer 32. The retainer 32 is fit within the cylindrical portion 30a of the shell. The annular ring 32b is inserted for abutment with the thin flange 30c. The column portions 32c are secured to the inner surface of the cylindrical portion 30a.

The thick flange 30b of the shell 30 is fit around the crankshaft 20 with the splines 30e being engaged with the axial splines 22c. The annular abutment plate 36 is fit around the step 22b of the crankshaft 22. The spacer 38 is fit in the annular groove 22d of the crankshaft 22 so as to sandwich the abutment plate 36 between the spacer 38 and the step 22b. Thus, the overrunning clutch A is held on the crankshaft 22 in a cantilever fashion.

The area of contact between the abutment plate 36 and the thick flange 30b are relatively large, and the abutment plate 36 is in close contact with the thick flange 30b and the annular ring 32a. By this arrangement, the overrunning clutch A is firmly secured onto the crankshaft 22, while the rollers 34 are held in parallel to the crankshaft 22.

After the overrunning clutch A has been fixedly mounted to the crankshaft 22, the needle bearing 28 is fit around the reduced diameter portion 22a. The transmission sleeve 18, together with the reduction gear 16, is inserted between the needle bearing 28 and the rollers 34 of the overrunning clutch A. Finally, a washer 40 is fit around the threaded end 22e of the reduced diameter portion 22a. A wing nut 42 and a lock nut 44 are threadably engaged with the threaded end 22e to prevent release of the transmission sleeve 18.

Operation of the transmission system with the overrunning clutch A thus constructed is as follows.

To start up an engine, the motor 10 is energized to rotate the sleeve 18 in the direction of an arrow $a_1$ through the drive gear 12, the idle gearing 14 and the reduction gear 16. The rollers 34 are then locked between the cam surfaces 30d and the outer peripheral surface of the sleeve 18. This allows transmission of rotation from the sleeve 18 to the shell 30 through the rollers 34. The shell 30 is then rotated in the direction of an arrow $b_1$. As the splines 30e of the thick flange 30b of the shell 30 are engaged with the axial splines 22c of the crankshaft 22, rotation of the shell 30 is transmitted to the crankshaft 22. The crankshaft 22 is then rotated in the direction of an arrow $c_1$ so as to start up the engine. At this time, the retainer 32, the rollers 34, the abutment plate 36, and the spacer 38 are all rotated together.

Although the motor 10 is deenergized after the engine has been started, the crankshaft 22 is rotated at a high speed in the direction of the arrow $c_1$ by the engine. Also, the shell 30, the retainer 32, the rollers 34, the abutment plate 36, the spacer 38 are rotated at a high speed in the direction of the arrow $b_1$. However, the sleeve 18 is stopped as it is connected through the reduction gear 16, the idle gearing 14, and the drive gear 12 to the motor 10 now stopped.

Figure 4:
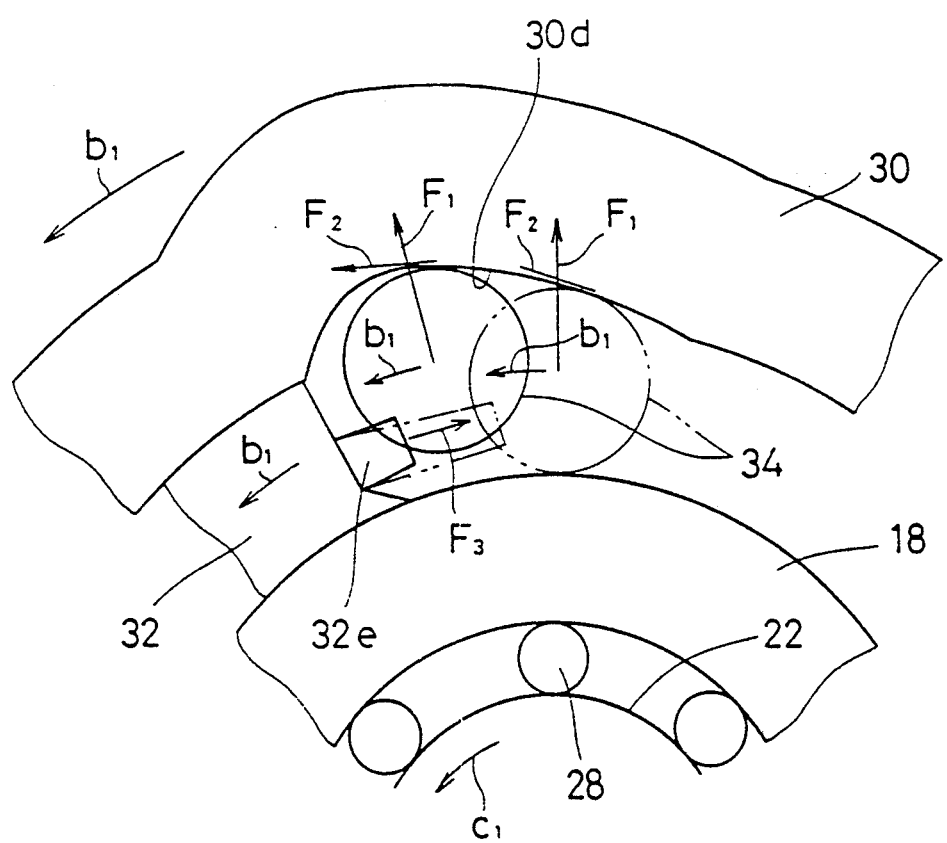
Figure 5:
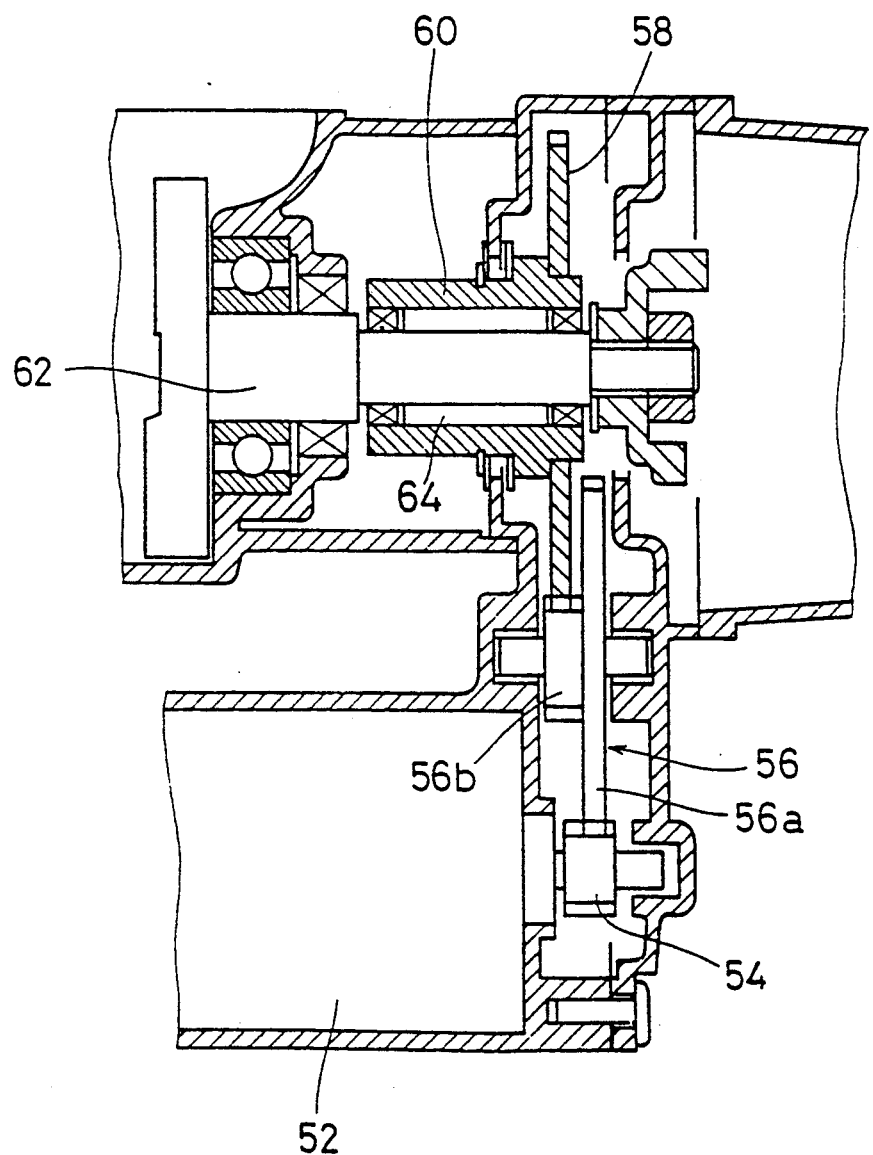
FIGS. 5 to 7 illustrate the prior art.
Figure 6:
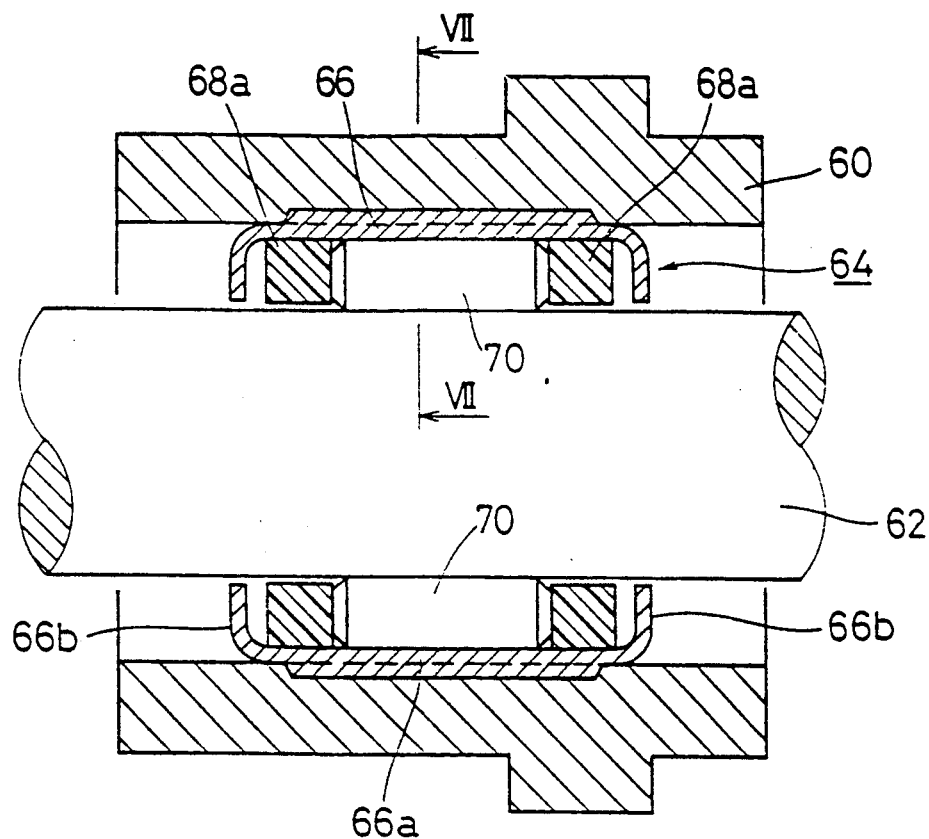
Figure 7:
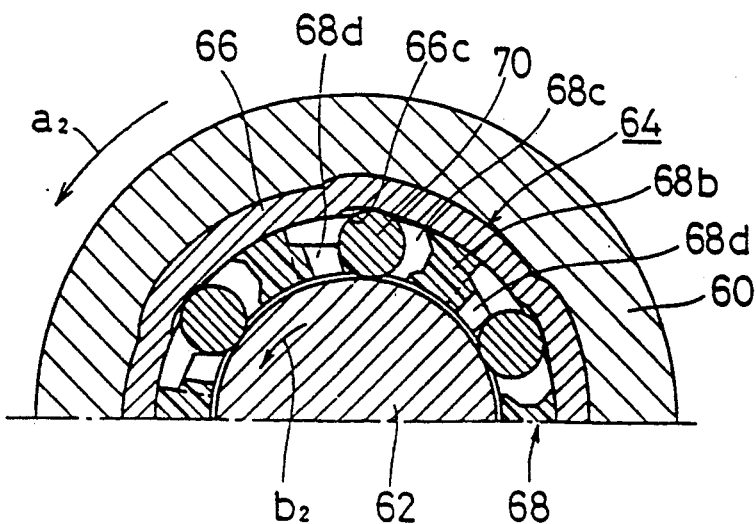

As shown in FIG. 4, a centrifugal force $F_1$ is produced when the roller 34 is rotated at a high speed in the direction of the arrow $b_1$. A component $F_2$ is then applied to the roller 34 along the cam surface 30d. This causes the roller 34 then contacted with the cam surface 30d to move in the direction in which the rollers 34 are free to race. This releases locking of the rollers 34 between the shell 30 and the sleeve 18. Accordingly, high speed rotation of the crankshaft 22 and the shell 30 is in no way transmitted to the sleeve 18 and thus, the starter motor 10.

As far as the crankshaft 22 is rotated at a high speed, the centrifugal force $F_1$ continues to be applied to the rollers 34. The resultant component $F_2$ is applied to the rollers 34 along the cam surfaces 30d so as to move the rollers 34 in the direction in which they are free to race. As a result, the rollers 34 are kept away from the sleeve 18 and subjected to no frictional heat from the sleeve in a stationary state. This prevents an increase in the temperature of the rollers 34 and thus, seizing of the rollers and damage to the retainer due to heat.

In the illustrated embodiment, the retainer 32 and the springs are integrally formed together. Alternatively, the present invention may include the retainer 32 and a discrete spring.

The present invention provides the following advantages.

The cylindrical body and the retainer are secured in an integral fashion to the driven shaft, and the rollers held in the retainer are rotated while the driven shaft is being rotated. A centrifugal force is then applied to the rollers. Such a centrifugal force causes the rollers to move along the cam surfaces against the action of the springs and move in a direction opposite to the direction in which the rollers are locked. As far as the driven shaft is rotated, the rollers continue to be able to race against the action of the springs. This prevents seizing of the rollers and damage to the retainer due to heat.

The cylindrical body is splined to the driven shaft. The annular abutment plate is used to position the cylindrical body relative to the driven shaft. The abutment plate is fixed in position by the fixing member. The cylindrical body is thus secured to the driven shaft in a cantilever fashion. The overrunning clutch of the present invention is thus simple and strong in structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An overrunning clutch comprising:
   a hollow drive shaft;
   a driven shaft including a large diameter portion and a small diameter portion loosely fit in said drive shaft;
   a cylindrical body having an inner peripheral surface extending around the peripheral surface of a transmission section positioned at one end of the drive shaft, and a plurality of cam surfaces formed in the inner peripheral surface and acting as an overrunning clutch, said cylindrical body being fit around the small diameter portion of the driven shaft to surround the transmission section of said drive shaft and splined to one end of the large diameter portion adjacent to the small diameter portion;
   a retainer held within said cylindrical body and including a plurality of roller pockets corresponding in position to said cam surfaces;
   a plurality of rollers rollingly disposed within the corresponding roller pockets for contacting the inner peripheral surface of said cylindrical body and the peripheral surface of the transmission section of said drive shaft;
   springs disposed within said roller pockets for urging said rollers in a direction in which the rollers are locked in the cam surfaces;
   an annular abutment plate fit around the small diameter portion of said driven shaft and having one side placed in abutment with said cylindrical body and an end surface of said large diameter portion so as to position said cylindrical body; and
   a fixing member fit around the small diameter portion of said driven shaft and having one side placed in abutment with said annular abutment plate to fix said annular abutment plate in place.

2. The overrunning clutch according to claim 1, wherein an other side of said annular abutment plate is placed in abutment with one end of said retainer.

3. The overrunning clutch according to claim 1, wherein the small diameter portion of said driven shaft has an annular groove adjacent to the large diameter portion, and said fixing member is received in said annular groove.

4. The overrunning clutch according to claim 1, wherein each of said cam surfaces includes a radial recess in which each of said rollers is held by said spring.

5. The overrunning clutch according to claim 1, wherein said overrunning clutch is in an engine starter.

* * * * *